United States Patent
Kerpez

(10) Patent No.: US 9,900,442 B2
(45) Date of Patent: Feb. 20, 2018

(54) LOW POWER SYSTEM AND METHOD FOR DSL LINES

(71) Applicant: ADAPTIVE SPECTRUM AND SIGNAL ALIGNMENT, INC., Redwood City, CA (US)

(72) Inventor: Kenneth J. Kerpez, Long Valley, NJ (US)

(*) Notice: Subject to any disclaimer, the term of this patent is extended or adjusted under 35 U.S.C. 154(b) by 15 days.

(21) Appl. No.: 14/910,879

(22) PCT Filed: Aug. 30, 2013

(86) PCT No.: PCT/US2013/057672
§ 371 (c)(1),
(2) Date: Feb. 8, 2016

(87) PCT Pub. No.: WO2015/030817
PCT Pub. Date: Mar. 5, 2015

(65) Prior Publication Data
US 2016/0205264 A1    Jul. 14, 2016

(51) Int. Cl.
 *H04M 9/08*  (2006.01)
 *H04M 11/06*  (2006.01)
 *H04B 15/00*  (2006.01)

(52) U.S. Cl.
 CPC ........ *H04M 11/062* (2013.01); *H04B 15/005* (2013.01); *Y02B 60/36* (2013.01)

(58) Field of Classification Search
 CPC .... H04B 15/005; H04M 11/06–11/068; Y02B 60/30–60/36
 See application file for complete search history.

(56) References Cited

U.S. PATENT DOCUMENTS

| | | | |
|---|---|---|---|
| 6,347,081 B1* | 2/2002 | Bruhn | H04W 52/0216 370/318 |
| 2010/0232486 A1* | 9/2010 | Starr | H04B 3/32 375/222 |

(Continued)

FOREIGN PATENT DOCUMENTS

WO    2013064096 A1    5/2013

OTHER PUBLICATIONS

International Preliminary Report on Patentability for International Application No. PCT/US2013/057672 dated Mar. 1, 2016, 8 pages.

(Continued)

*Primary Examiner* — Hemant Patel
(74) *Attorney, Agent, or Firm* — North Weber & Baugh LLP

(57) ABSTRACT

The transmit power level of a transceiver coupled to a digital subscriber line (DSL) line is reduced from a first transmit power level sufficient for the transceiver to continuously transmit data on the DSL line at a first bit rate to a second transmit power level below the first transmit power level sufficient for the transceiver to continuously transmit data on the DSL line at a second bit rate that is lower than the first bit rate. The reduction in transmit power is limited so that the change does not induce time-varying crosstalk sufficient to destabilize a nearby DSL line. While the transmit power level of the transceiver is reduced to the second transmit power level, the transceiver is suspended from transmitting data on the DSL line for repeated periods of time. Suspending the data transmission is controlled to avoid further time-varying crosstalk sufficient to destabilize the nearby DSL line.

25 Claims, 7 Drawing Sheets

(56) References Cited

U.S. PATENT DOCUMENTS

| | | | | |
|---|---|---|---|---|
| 2011/0019578 A1* | 1/2011 | Berg | ............... | H04L 12/10 |
| | | | | 370/252 |
| 2013/0107917 A1* | 5/2013 | Gupta | ............... | H04L 27/30 |
| | | | | 375/219 |
| 2014/0254791 A1* | 9/2014 | Wei | ............... | H04M 11/062 |
| | | | | 379/406.01 |

OTHER PUBLICATIONS

International Search Report & Written Opinion dated May 28, 2014 for PCT Patent Application No. PCT/US2013/057672.

BT: "G, fast: Low Power Modes—Continued; TD2013-03-04-Q4-067", ITU-T Draft; Study Period 2013-2016, Int'l Telecommunication Union, Geneva; CH, vol. 4a/15, May 10, 2013, pp. 1-8 XP017580484.

Les Humphrey: "G.ADSL: Low Power Sub-States for use with ADSL2 (and (ADSL2plus); TD11BM-068", ITU-T Draft; Study Period 2009-2012, Int'l Telecommunication Union, Geneva; Ch, vol. 4/15, Jun. 15, 2011, pp. 1-6, KP01759065.

Associate Rapporteur for G Fast: "G.fast: UPdated Issues List for G.fast; TD2013-07-Q4-U20", ITU-T Draft; Study Period 2013-2016, Int'l Telecommunication Union, Geneva; Ch, vol. 4/15, Jul. 1-12, 2013, pp. 1-52 XP017580494.

* cited by examiner

LOW POWER SYSTEM AND METHOD FOR DSL LINES

CLAIM FOR PRIORITY

This application is a 371 National Phase application of, and claims priority to PCT Patent Application Serial No. PCT/US2013/057672, filed on 30 Aug. 2013, titled "LOW POWER SYSTEM AND METHOD FOR DSL LINES," and which is incorporated by reference in entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of communication systems and more specifically to a method and apparatus for reducing power consumption and noise in a communication system.

BACKGROUND

Digital Subscriber Line (DSL) lines are often underutilized, at times transmitting little or no data, which is an inefficient use of power. It may take a minute or more to re-start a DSL line that has been completely turned off. Thus, completely turning off a DSL line to save power often causes undesirable delay in re-starting the DSL line. There are many times when it would be desirable to transmit data on the DSL line at low bit-rates sufficient, for example, to transmit keep-alives and/or possibly certain types of data traffic, such as low levels of Internet data traffic, or Voice over Internet Protocol (VoIP) data traffic, with very low power consumption.

The low-power states used in current DSL line transmission standards such as ADSL2 and ADSL2plus [ITU-T standards G.992.3 and G.992.5] can save power on DSL lines by lowering the transmit power and the transmit power spectral density (PSD), and using lower bit loading to carry traffic on the DSL line at a lower bit rate. This low-power state is referred to as "L2-mode." L2-mode can lower transmit power by up to 31 dB total maximum aggregate transmit power reduction in L2-mode (L2-ATPRT).

FIG. 2 illustrates a typical DSL environment 200 in which two DSL lines are located within the same cable. In particular, the telephone local loop or cable 112 is coupled from Digital Subscriber Line Access Multiplexer (DSLAM)/AN 114 to one or more TU-R units, for example, TU-R 122a and TU-R 122b. Multiple DSL lines may exist within the cable, for example, DSL line 112a coupled from TU-C 142a to TU-R 122a, and nearby DSL line 112b coupled from TU-C 142b to TU-R 122b. DSL lines adapt to the channel and noise levels at start-up, and if the noise subsequently increases by a level at or above the signal to noise ratio (SNR) margin then the DSL line can become unstable and resynchronize. Much of the noise is "crosstalk", such as depicted at 205, from other DSL lines using the same cable, in the same loop, or in the same binder, caused by transmitting signals in both the downstream direction 210 and/or the upstream direction 215. A potential problem with low power states on a DSL line is that they can create time-varying crosstalk, also referred to as fluctuating crosstalk, non-stationary crosstalk, or short-term stationary crosstalk in nearby or neighboring DSL lines. Raising and lowering the transmit power or transmit PSD levels of signals transmitted on the DSL line also raises and lowers the crosstalk received by nearby DSL lines. If the crosstalk abruptly or suddenly increases by a large amount then one or more of these nearby DSL lines may need to resynchronize; such "instability" is highly undesirable. Resynchronization can be avoided by certain methods including slowly exiting from the low-power states, as described in U.S. patent application Ser. No. 12/700,892 entitled Apparatus, Systems and Methods for DSM Energy Management, assigned to the assignee of this patent application. Such methods allow nearby DSL lines sufficient time to adapt to the higher crosstalk level induced by increasing the transmit power and transmit PSD levels of signals transmitted on a DSL line via seamless rate adaptation (SRA) or other techniques. However, the current DSL standards and DSL equipment do not allow slow exit from low-power mode; it can only be done rapidly, as set forth in ITU-T G.992.3 and G.992.5, and Broadband Forum TR-202, which creates instability in nearby DSL lines. Further, while low-power states may be gradually entered, this does little to help stability. Power consumption can also be reduced by suspending data transmission on a DSL line entirely for brief moments when there is no data traffic to transmit, or by queuing the data traffic for transmission at a later time. This suspension of data traffic on the DSL line is referred to as "discontinuous operation." With reference to FIG. 3, discontinuous operation 300 involves the DSL transceiver's transmitter turning "ON" and transmitting at some times (305, 315, 325 and 335), and turning "OFF" the transmitter at other times (310, 320, and 330). The duration of the ON and OFF times could be any possible value. Alternatively, to ensure synchronization of the DSL line or to track channel variations on the DSL line the maximum OFF time and/or the minimum ON time may be specified. FIG. 3 illustrates at 340, 345 and 350 turning on the transmitter, for example, when traffic arrives at the transmitter, when the amount of traffic arriving at the transmitter increases, when a queue maintained by the transceiver in which traffic to be transmitted by the transmitter reaches a certain threshold, or when a timer reaches a certain time or time out value. When there is no traffic to transmit, the transmitter may be turned OFF. Turning the transmitter OFF may even involve briefly turning off DSL transceiver functionality entirely, which could enable large power savings. Discontinuous operation is generally performed in real-time, in sub-second on/off duration times. Discontinuous operation can, however, cause very large and frequent fluctuations in crosstalk and can cause widespread instability problems in neighboring DSL lines. Also, a DSL line that doesn't transmit for a long time may itself lose synchronization and not properly track the channel.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Figure 1:
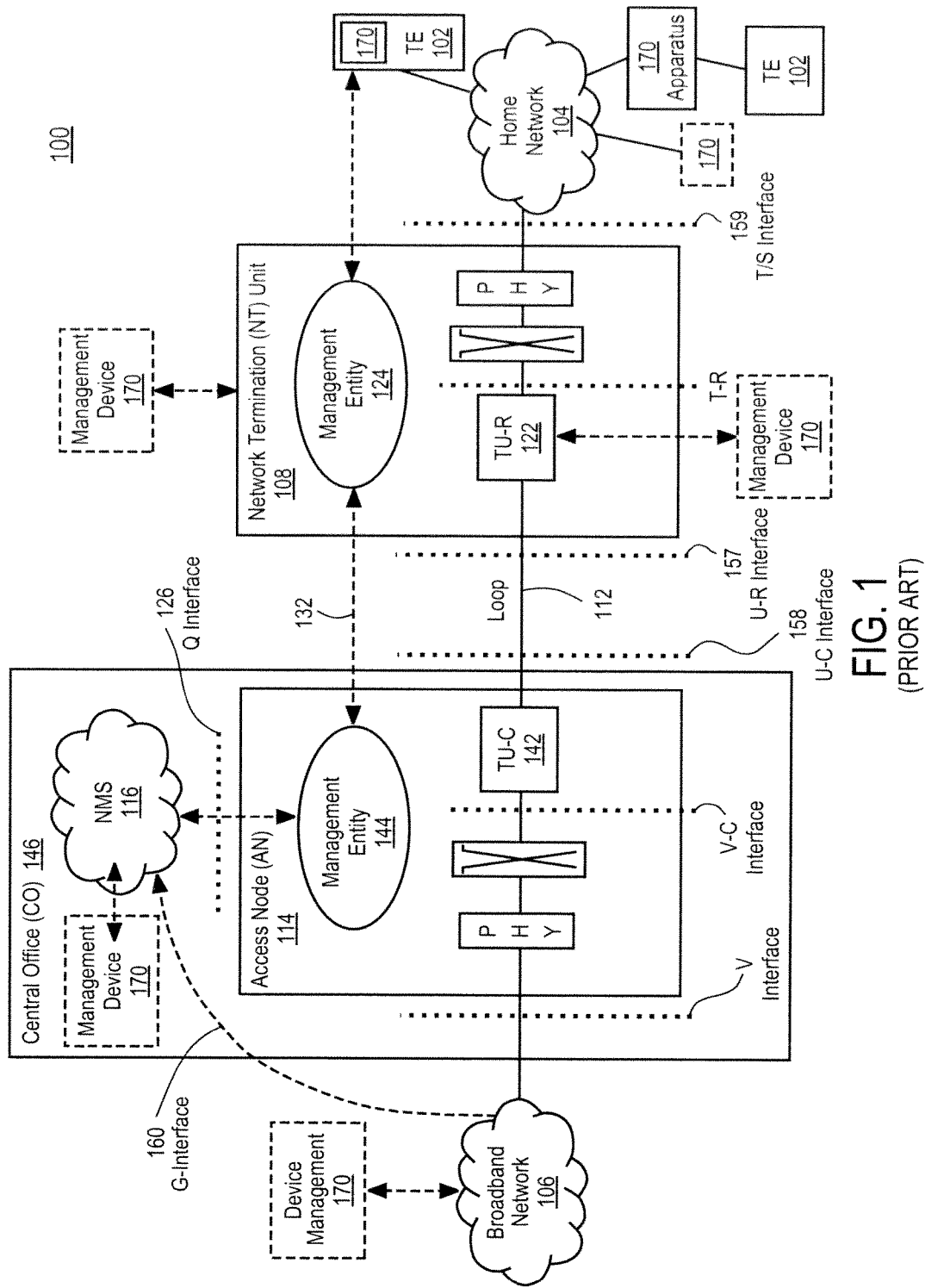
FIG. 1 illustrates an exemplary architecture in which embodiments of the invention may operate.
Figure 2:
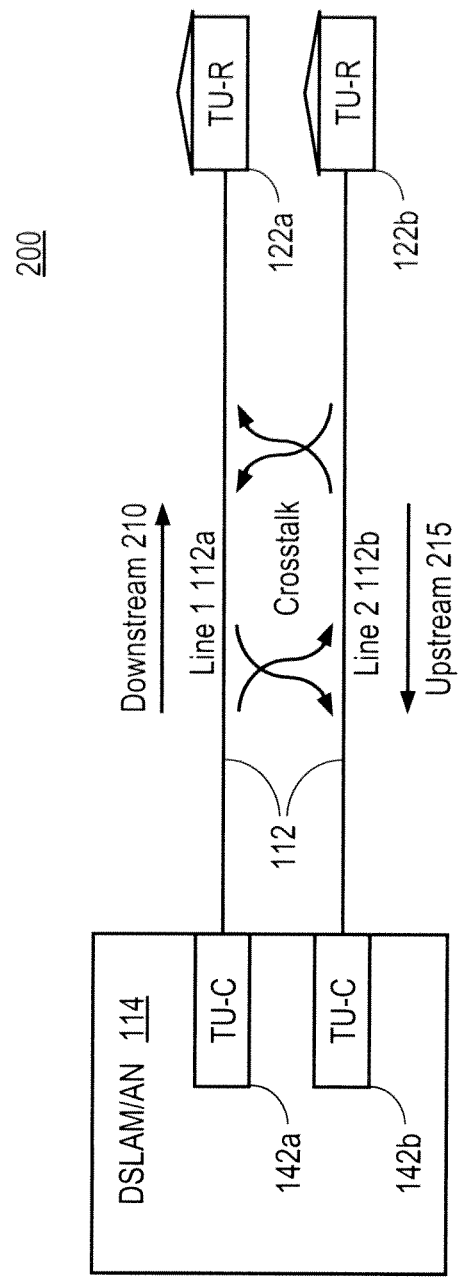
FIG. 2 illustrates crosstalk between two DSL lines in the same cable.
Figure 3:
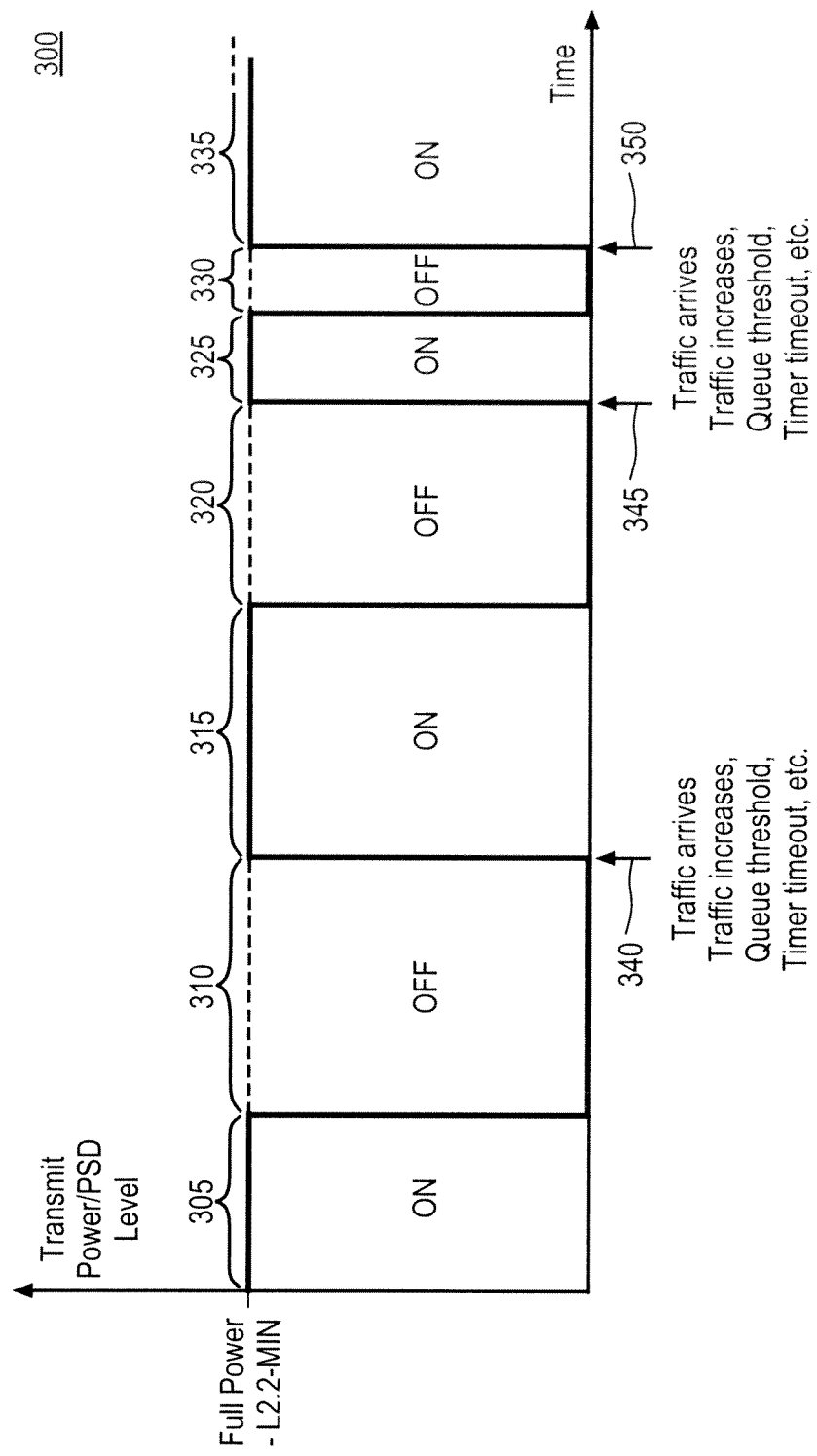
FIG. 3 illustrates discontinuous operation of a DSL line in exemplary embodiments of the invention.

Embodiments of the invention relate to a system and method of low-power operation for DSL lines that combines the use of lower transmit power or lower transmit power spectral density (PSD) with the use of discontinuous operation. In one embodiment of the invention, there are four exemplary power states: full power (L0), low transmit power or transmit PSD level (L2.0), lowest transmit power or transmit PSD level (L2.1), and a low transmit power or transmit PSD level combined with discontinuous operation (L2.2). Discontinuous operation is not used except when the transmit power or transmit PSD is at a low enough level that the crosstalk induced by such into neighboring DSL lines does not destabilize the lines. Such embodiments enable a very low power usage, since both the transmit PSD is lowered and DSL transceiver functionality can be intermittently turned off with discontinuous operation. As described further below, some embodiments further incorporate a management system that optimizes DSL settings for a given DSL line to enhance performance, increase power savings, and maintain stability of nearby DSL lines. Embodiments of the invention create a particularly useful set of low-power transmission states and manage the transitions between these states, with DSL data throughput, power usage, and crosstalk impacts all varying synergistically between the states.

Embodiments of the invention are primarily targeted for use with VDSL2 or G.fast, but may be applied to any DSL technology. As used herein, the term "DSL" refers to any of a variety and/or variant of DSL technology such as, for example, Asymmetric DSL (ADSL), ADSL2, ADSL2plus, High-speed DSL (HDSL), HDSL2, Symmetric DSL (SDSL), SHDSL, Very high-speed/Very high-bit-rate DSL (VDSL), VDSL2, vectored VDSL2, and/or G.fast. Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for DSL modems supporting Vectoring, I.T.U. standard G.998.4 for DSL modems supporting retransmission, I.T.U. standard G.994.1 (G.hs) for modems implementing handshake, and/or the I.T.U. G.997.1 (a.k.a. G.ploam) standard for management of DSL modems. The G.997.1 standard specifies the physical layer management for ADSL transmission systems based on the clear, Embedded Operation Channel (EOC) defined in G.997.1 and use of indicator bits and EOC messages defined in the G.992.x, G.993.x and G.998.4 standards. Moreover, G.997.1 specifies network management elements content for configuration, fault and performance management. In performing the disclosed functions, systems may utilize a variety of operational data (which includes performance data) that is available at an Access Node (AN). The DSL lines with low-power states and the DSL lines receiving crosstalk, as described herein, may be any of these DSL types.

FIG. 1 illustrates an exemplary architecture 100 in which embodiments may operate in compliance with the foregoing standards. In FIG. 1, user's terminal equipment 102 (e.g., a Customer Premises Equipment (CPE) device or a computer, network node, LAN device, etc.) is coupled to a home network 104, which in turn is coupled to a Network Termination (NT) Unit 108. Multiple xTU devices ("all Transceiver Unit" devices) are further depicted. An xTU provides modulation for a DSL loop or line (e.g., DSL, ADSL, VDSL, etc.). In one embodiment, NT unit 108 includes an xTU-R (xTU Remote), 122 (for example, a transceiver defined by one of the ADSL or VDSL standards) or any other suitable network termination modem, transceiver or other communication unit. NT unit 108 also includes a Management Entity (ME) 124.

Management Entity 124 may be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program; via Transaction Language 1 (TL1) commands, TL1 being a long-established command language used to program responses and commands between telecommunication network elements; via embedded operations channel (eoc) signaling over the DSL line, or via a TR-69 based protocol. "TR-69" or "Technical Report 069" is in reference to a DSL Forum technical specification entitled CPE WAN Management Protocol (CWMP) that defines an application layer protocol for remote management of end-user devices. XML or "eXtended Markup Language" compliant programming and interface tools may also be used.

In one embodiment, Network Termination Unit 108 is communicably interfaced with a management device 170 as described herein. In another embodiment, xTU-R 122 is communicably interfaced with management device 170. Each xTU-R 122 in a system may be coupled with an xTU-C (xTU Central) in a Central Office (CO) or other central location. The xTU-C 142 is located at an Access Node (AN) 114 in Central Office 146. A Management Entity (ME) 144 likewise maintains an MIB of operational data pertaining to xTU-C 142. The Access Node 114 may be coupled to a broadband network 106 or other network, as will be appreciated by those skilled in the art. Each of xTU-R 122 and xTU-C 142 are coupled together by a U-interface/loop 112, which in the case of ADSL may be a twisted pair line, such as a telephone line, which may carry other communication services besides DSL based communications. Either Management Entity 124 or Management Entity 144 may implement and incorporate a management device 170 as described herein.

Management device 170 may be managed or operated by a service provider of the DSL services or may be operated by a third party, separate from the entity which provides DSL services to end-users. Thus, in accordance with one embodiment apparatus 170 is operated and managed by an entity that is separate and distinct from a telecommunications operator responsible for a plurality of digital communication lines. Management Entity 124 or Management Entity 144 may further store information collected from apparatus 170 within an associated MIB.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from xTU-C 142, while far-end parameters from xTU-R 122 may be derived by either of two interfaces over the U-interface. Indicator bits and EOC messages may be sent using embedded channel 132 and provided at the Physical Medium Dependent (PMD) layer, and may be used to generate the required xTU-R 122 parameters in ME 144. Alternately, the Operations, Administration and Maintenance (OAM) channel and a suitable protocol may be used to retrieve the parameters from xTU-R 122 when requested by Management Entity 144. Similarly, the far-end parameters from xTU-C 142 may be derived by either of two interfaces over the U-interface. Indicator bits and EOC message provided at the PMD layer may be used to generate the required xTU-C 142 parameters in Management Entity 124 of NT unit 108. Alternately, the OAM channel and a suitable protocol may be used to retrieve the parameters from xTU-C 142 when requested by Management Entity 124. Additionally depicted is G-interface 160 between NMS 116 and broadband network 160.

At the U-interface (also referred to as local loop, or simply loop 112), there are two management interfaces, one at xTU-C 142 (the U-C interface 158) and one at xTU-R 122 (the U-R interface 157). The U-C interface 158 provides xTU-C near-end parameters for xTU-R 122 to retrieve over the U-interface/loop 112. Similarly, the U-R interface 157 provides xTU-R near-end parameters for xTU-C 142 to retrieve over the U-interface/loop 112. The parameters that apply may be dependent upon the transceiver standard being used (for example, G.992.5 or G.993.2). The G.997.1 standard specifies an optional Operation, Administration, and Maintenance (OAM) communication channel across the U-interface. If this channel is implemented, xTU-C and xTU-R pairs may use it for transporting physical layer OAM messages. Thus, the xTU transceivers 122 and 142 of such a system share various operational data maintained in their respective MIBs.

Depicted within FIG. 1 is management device 170 operating at various optional locations in accordance with several alternative embodiments. For example, management device 170 is located within home network 104, such as within a LAN. In an alternative embodiment, management device 170 is located at central office 146 and interfaced to home network 104 (e.g., a LAN) and broadband network 106 (e.g., DSL) via NMS 116. In yet another embodiment, management device 170 operates on the broadband network 106 (e.g., on the DSL). In one embodiment apparatus 170 operates as a DSL modem, such as a Customer Premises (CPE) modem. In another embodiment, apparatus 170 operates as a controller card or as a chipset within a user's terminal equipment 102 (e.g., a Customer Premises Equipment (CPE) device or a remote terminal device, network node, LAN device, etc.) coupled to the home network 104 as depicted. In still another embodiment, apparatus 170 operates as a separate and physically distinct stand-alone unit which is connected between the user's terminal equipment 102 and a DSL line or loop. For example, apparatus 170 may operate as a stand-alone signal-conditioning device. In yet another embodiment, apparatus 170 is connected with a NT unit 108 or with xTU-R 122 over the T/S interface 159.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building. As used herein, the term "service provider" refers to any of a variety of entities that provide, sell, provision, troubleshoot and/or maintain communication services and/or communication equipment. Example service providers include a telephone operating company, a cable operating company, a wireless operating company, an Internet service provider, or any service that may independently or in conjunction with a broadband communications service provider offer services that diagnose or improve broadband communications services (DSL, DSL services, cable, etc.).

Power States

Table 1 below defines the DSL low-power states considered in one embodiment of the invention. State L2.0 may in one embodiment contain an array of substates, where each substate L2.0-x is identified by the number, x, indicating the transmit power reduction below full power, as measured in dB.

TABLE 1

DSL Power States

| Informal name | State | Transmit power & transmit PSD level | Operation |
| --- | --- | --- | --- |
| Full-power | L0 (aka L0.0) | Full power | Continuous |
| Reduced power L0 (reduced by x dB) | L2.0 Substates: L2.0-x | Reduced power and transmit PSD | Continuous |
| VoIP and keep alive (at least 256 kbps) | L2.1 | Maximally reduced power and transmit PSD | Continuous |
| Keep alive | L2.2 | Maximal (or near maximal) reduced power and transmit PSD | Discontinuous |

Continuous operation refers to constantly transmitting signals across the DSL line, and if there is no data to transmit then dummy or pad bits are transmitted. DSL lines normally transmit continuously. Discontinuous operation suspends transmission when there is no data traffic to send, or when data traffic transmission can be suspended, the data traffic queued during suspension, and then later resumed. Discontinuous operation can turn DSL data transmission on and off rapidly, and stay on or off for a time period as brief as the 250 microsecond duration of each Discrete Multi-Tone (DMT) DSL data symbol. According to one embodiment, discontinuous operation still provides for transmission of signal on the DSL line at a low level when considered "off" to carry pre-coding signals for vectoring. According to another embodiment, some traffic may be queued and later sent as a group of traffic, together in one contiguous "on"

burst. Further, many DSL transceiver functionalities can be turned off when discontinuous operation is not sending any data, resulting in a higher power reduction, in some instances, greater than 50%.

In OFF times data is generally not transmitted, however for vectored systems the signals from the vector pre-coder may continue to be transmitted downstream. A variant of discontinuous operation only suspends data transmission on some frequencies but continues to transmit data on other frequencies during OFF times, this may be done to eliminate time-varying crosstalk into other services such as ADSL that operate only on some overlapping frequencies. Another variant of discontinuous operation completely suspends data transmission on some frequencies and occasionally sends signals only on other frequencies during ON times for uses such as "keep-alive" signaling for synchronization, channel/crosstalk tracking, and operations/maintenance signaling, which may be done to save additional power Discontinuous operation should be controlled, and may need to occasionally transmit signals at various frequencies for channel or crosstalk estimation, such as occasionally transmitting on all frequencies, or transmitting on different frequencies at different times so that eventually all or most frequencies are used and are therefore tracked. Discontinuous operation may be pre-defined to only transmit some discrete multi-tone (DMT) symbols (e.g., transmit even numbered symbols or just synch symbols), or the symbols to transmit may be selected on-the-fly depending on current traffic. Entire super-frames may be transmitted or not. Discontinuous operation should support some (programmable) minimum bit rate.

In an alternative embodiment, multiple sub-states are defined for discontinuous operation with different transmit power and transmit PSD levels, so that there are multiple sub-states of L2.2. According to another embodiment, Save Our Showtime (SOS) is incorporated as a power state, or SOS is used for power state transitions. SOS is described in ITU-T G.993.2, and is designed to allow a pair of DSL modems to rapidly adapt to changes in the noise environment on the DSL line to which they are coupled with a rapid change in aggregate bit-rate. Further, low-power state transitions can be controlled via an on-line reconfiguration (OLR) procedure.

An aspect of one embodiment of the invention is to control the operation of low-power modes so that they do not decrease the stability of nearby DSL lines that receive crosstalk. Three elements, according to various embodiments, further this purpose: gradual exit from low-power states, discontinuous operation only at low transmit power, and an exchange of data and control information with a management system.

Figure 4:
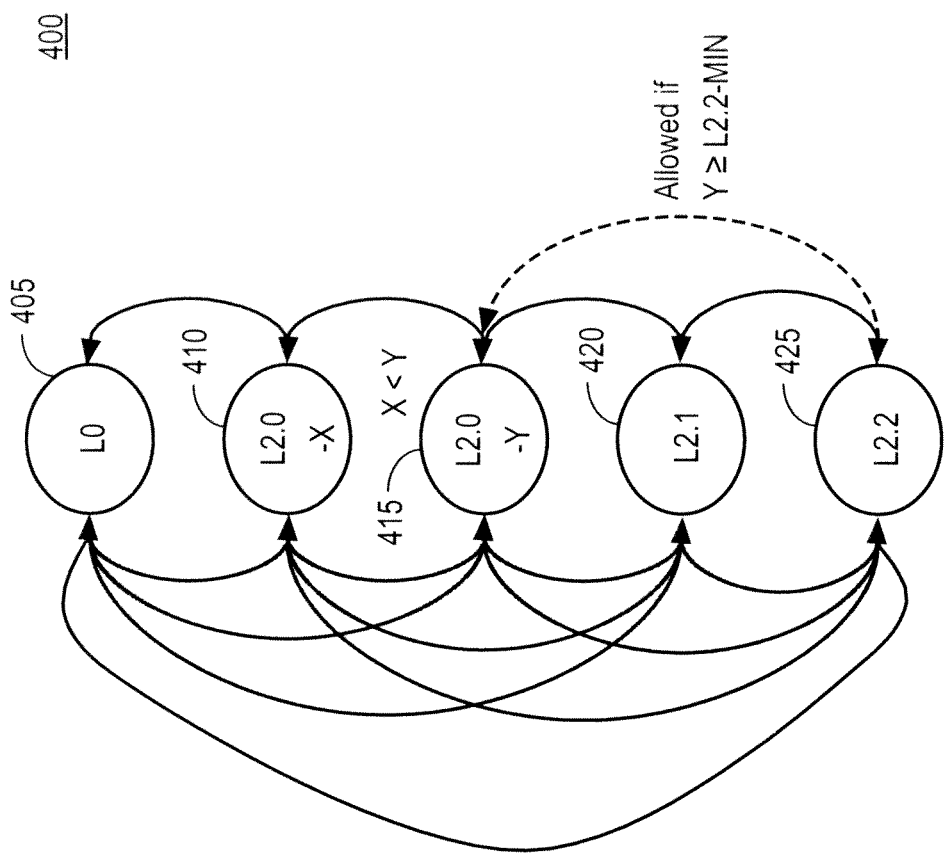
FIG. 4 illustrates an example of different power states (circles), and allowed transitions between power states (lines with arrowheads showing the direction of the allowed state transitions), according to embodiments of the invention.

FIG. 4 illustrates an example state diagram 400 for different power states or modes (depicted by circles 405, 410, 415, 420 and 425), and allowed transitions between power states (lines with arrowheads showing the direction of the allowed state transitions between different power states), according to embodiments of the invention. L0 at 405 is the full power state and all other states are the above-described low-, or reduced-power states. FIG. 4 shows one example of a set of allowable state transitions, but it is contemplated that the set of allowable state transitions can be programmable, so that any state transition may be enabled or disabled. For example, it may be desired in some cases to enable direct transitions from any one of the reduced-power states to the L0 state, for example, if there is suddenly high user traffic demand.

In the embodiment illustrated in FIG. 4, state diagram 400 includes four low-, or reduced-power modes, L2.0-X, L2.0-Y, L2.1 and L2.2. In L2.0-X state 410, transmit power spectral density (PSD) is lowered by "X" dB power trim, and a low bit rate is maintained. In L2.0-Y state 415, transmit PSD is lowered by "Y" dB power trim, where "X"<"Y", and a lower bit rate is maintained. In L2.1 state 420, transmit PSD is lowered by the maximum amount, and a very low bit rate is maintained. Finally, in In L2.2 state 425, transmit PSD is lowered by the maximum amount, an extremely low bit rate is maintained, and, importantly, discontinuous operation is enabled, in which the transmitting DSL signal is turned off for brief periods of time.

L2, more generally, is considered a power management mode, which reduces the power consumed by DSL modems (transceivers) for periods of time when there is little or no traffic on the line, such as according to ITU-T Recommendation G.992.3 (ADSL2) and Recommendation G.992.5 (ADSL2plus). During a reduced power mode, in one embodiment, the transmitted signal can be modified by reducing the amplitude of the DSL signal during the times when data traffic sent by applications over the DSL connection is adequately small, thereby reducing the power consumed by the DSL transceiver. For instance, the amplitude of each of the DMT tones (tones are also called sub-carriers) can be reduced, including the number of data bits transmitted per tone. In one embodiment, the lower power modes reduce the power transmitted into the DSL line, thus reducing overall power used by the DSL transceiver.

In one embodiment, application or user data sent over a DSL network may not be transmitted over the DSL connection while a transmitting and a receiving pair of DSL transceivers is in an L2 mode; instead the information encoded over the DSL connection may be solely that required to keep the connection between the two DSL modems established and synchronized, while allowing the DSL modems to exchange the messages required to leave the L2 mode and return to normal transmission (mode L0) when application or user data is again available or ready for transmission. In another embodiment, low-bitrate application data can be transmitted during an L2 mode, such as VoIP application data.

Figure 5:
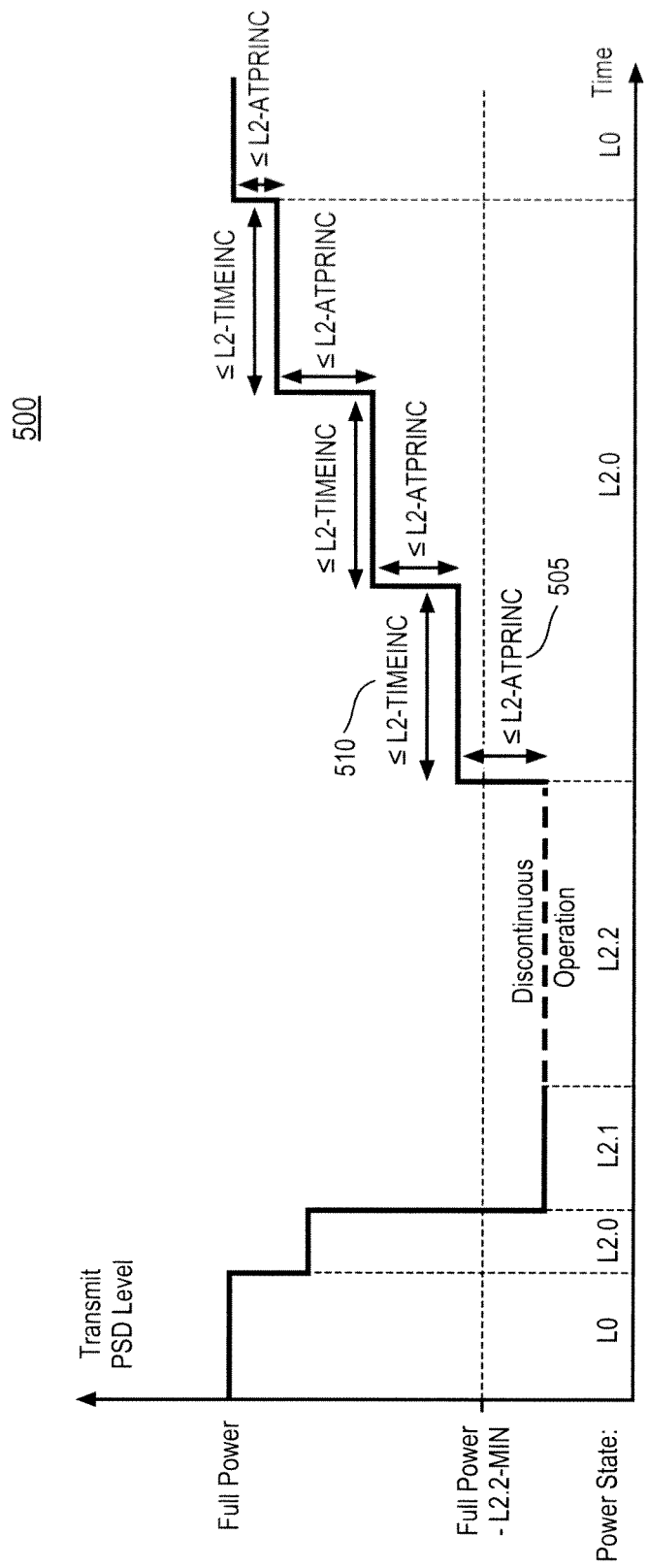
FIG. 5 illustrates low-power state transitions according to embodiments of the invention.

FIG. 5 depicts an illustrative embodiment 500 of power reductions achieved during the showtime state, when a DSL modem enters a reduced-power state such as L2.0, L2.1 and L2.2. These DSL low power modes can enable a transmitting and receiving pair of DSL modems supporting the DSL connection to enter and leave the lower power modes when low levels of data traffic, or no data traffic, are being transmitted over the DSL connection. The signal transmitted during the modes can keep the connection between the two DSL modems established and synchronized, and the signal can return to full-power data transmission capabilities as soon as a high-bit-rate application makes such a request. Entering into a reduced power mode and leaving the reduced power mode can occur fast enough so that the application processes at each end of the DSL connection dealing with the transferred data are not affected by the transitions from an L2.x mode back to the L0 normal transmission mode.

As a result of the intermittent nature of data packets to and from a DSL customer, the DSL line may frequently transition between the full power (L0) and various of the low power (L2.x) modes. These transitions between the L0 and the L2.x modes may occur as frequently as once every one or two seconds due to relatively short but frequent gaps in the DSL user's data stream. Additionally these transitions into and out of the L2.x modes can occur at varying and unpredictable intervals based solely on the specific nature of the communications carried over the DSL connection. The occurrence of such transitions can be difficult to characterize or predict. Both of these characteristics of the transitions can cause frequent fluctuations in the transmitted spectrum and signal level from a DSL modem transitioning between the L0 an L2.x mode. These changes can occur at various and unpredictable times.

As discussed elsewhere in this document, crosstalk is the resulting signal coupled to other lines in the cable, which will correspondingly fluctuate with the transitions between the L0 mode and one of the L2.x modes. Receivers on the other DSL lines in the same cable can see this crosstalk as noise. Fluctuating crosstalk, which is known as non-stationary or time-varying crosstalk, can be more disruptive to the decoding of the signal by the receiving DSL modem than constant crosstalk because it is difficult for a receiver to adapt to the changing noise level.

In FIG. 5, the low-power state transitions, according to embodiments of the invention, are limited by the control of low-power mode (LPM) management information database (MIB) elements to limit time-varying crosstalk for stability. In particular, the maximum aggregate transmit power increase (L2-ATPRINC) LPM MIB element limits the levels of each power increase and the minimum L2 time interval between L2 power increases (L2-TIMEINC) LPM MIB element limits the minimum time between each power increase. The use of discontinuous operation in state L2.2 at 425 is shown to be at a transmit PSD level below the highest level that allows nearby DSL lines to be stable, and is referred to herein as the maximum stable discontinuous transmit power level. The maximum stable discontinuous transmit power level equals full power lowered by the minimum stable discontinuous transmit power trim (L2.2-MIN).

Figure 6:
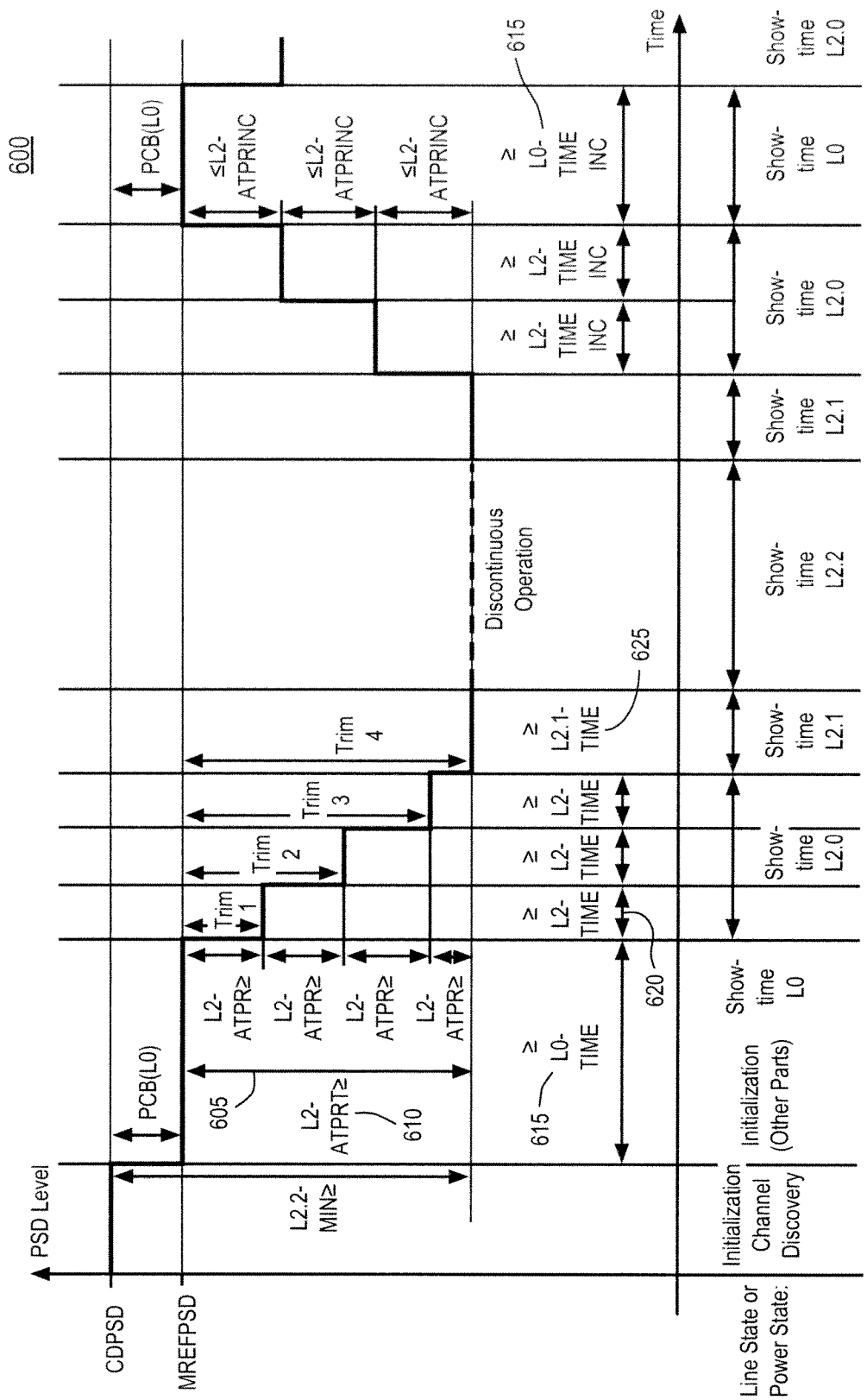
FIG. 6 illustrates DSL line and low-power state transitions according to embodiments of the invention.

FIG. 6 illustrates further DSL line and low-power state transitions, according to embodiments of the invention, limited by the control of low-power mode (LPM) management information database (MIB) elements. According to the embodiments, LPM MIB elements such as: the aggregate transmit power reduction (L2-ATPR) 605 limits the level of each power trim; the total maximum aggregate transmit power reduction in L2 (L2-ATPRT) 610 limits the total level of power trimming; the minimum L0 time interval between L2 exit and the next L2 entry (L0-TIME) 615 limits the minimum time in L0 before a power trim; the minimum L2 time interval between L2 entry and the first L2 trim (L2-TIME) 620 limits the minimum time between power trims; and the minimum time interval between L2.1 and L2.2 (L2.1-TIME) 625 limits the minimum time between entering L2.1 or dropping below the maximum stable discontinuous transmit power level and then transitioning to discontinuous operation in L2.2.

Gradual Exit

Prior art DSL low-power modes do not allow a gradual exit to full-power, the logic being that when a user wants to transmit or receive data over a DSL line, the user wants to do so with no delay. There are two potential problems with this: quick exit to full power creates potentially damaging large increases in crosstalk in nearby DSL lines, and the alleged need to quickly exit to full power is based on a naïve view of user-perceived Quality of Experience (QoE).

A DSL line can be in low power state for a time period during which other nearby DSL lines adapt to the low crosstalk caused by the low-power DSL line. Then, the low-power DSL line abruptly transitions to full power, and the neighboring DSL lines receiving crosstalk from it experience a correspondingly large increase in crosstalk. If the crosstalk and noise increases by more than their signal-to-noise ratio (SNR) margin, then the nearby DSL lines experiencing this crosstalk and noise will become unstable and re-start or resynchronize. Resynchronization may also be induced by errors caused by the sudden crosstalk increase. If a low-power DSL line increases it's transmit power by x dB, then the SNR margin of nearby DSL lines receiving crosstalk from that DSL line can decrease by up to x dB, in the worst case. Typical DSL line SNR margin is 6 dB, and 9-30 dB power reduction may be enabled in low-power states, so rapid exit from low-power states can often be sufficient to cause nearby DSL lines to become unstable.

Embodiments of the invention enable a controlled gradual increase in transmit power, or transmit power and bit rate, on a DSL line, for a gradual exit from low-power states. If a first DSL line exits a low-power state then it may only increase transmit power by a limited amount, for example, Y dB. If Y is less than the SNR margin of a second, nearby, DSL line, then the second DSL line can absorb a resulting increase of up to Y dB in crosstalk power, for example, by using seamless rate adaptation (SRA). SRA can lower the bit loading and if needed also lower the bit-rate in response to a crosstalk or a noise increase, and thereby restore the SNR margin. The speed of SRA is configurable, and it can be very rapid, in a few seconds. So, for example, DSL line 1 in a low-power state can be configured, according to one embodiment, to increase transmit power by at most 3 dB, no more often than once every 2 seconds. In so doing, DSL line 2 receiving crosstalk from DSL line 1 can adapt with SRA without having errors or resynchronization events. SRA lowers the rate of DSL line 2 receiving crosstalk; however at most it is lowered to the rate attained with full-power crosstalk from DSL line 1, which is the rate of crosstalk that DSL line 2 would have had if DSL line 1 did not use low power states anyway.

QoE can be maintained with gradual exit from low-power states, either by making use of low-power states sufficiently infrequently (for example during periods of reduced or no use of the DSL line), by interacting with higher protocol layers, or by coordinating low-power state usage with a management system. It's not uncommon for a user to wait 10 seconds to even a minute or more to start-up a personal computer, or to begin watching a video, or to receive a large download of information, etc. Thus, the user will tolerate some amount of time for an exit from low-power state. The exit may occur after receiving a notification (for example, passed through the transceiver to the physical layer) of an impending traffic increase sent from an application or higher layer. Low-power states can be coordinated with resource allocation and session initiation. A notification of a session initiation may simply indicate that a high-traffic session is impending, or it may also indicate the impending level of traffic and when it will start. An indication of support for such session notification should be reported. For example, a DSLAM may send a query to a user CPE device to determine whether the device is capable of supporting session notification. If the CPE responds affirmatively, the DSLAM may then transmit the notification. Other notifications between layers can assist QoE with low-power states.

Gradual wake up performed purely at the physical layer can disrupt certain types of internet traffic, such as VoIP traffic, since a burst of new traffic can cause the internet traffic to be delayed or dropped before power and bit-rate are increased if there is only a single physical layer queue. Interaction with higher layers can limit time-varying crosstalk without impacting QoE. According to one embodiment, one solution is to maintain a high-priority queue for certain types of susceptible traffic, such as VoIP traffic.

Management System

In one embodiment, low-power states can be configured with settings (such as threshold information that indicates a certain amount of data may be transmitted for a certain period of time) that should suffice in most cases and then the DSL lines may run autonomously. However, performance may be significantly increased if a DSL management system collects data and adjusts settings to improve performance with low-power states. Performance includes factors such as bit rates, error rates, line stability, and power consumption. Data can be collected on the actual use of the low power states, the DSL line transmission environment, DSL line status, test, diagnostics, and performance monitoring data. The management system can be a Spectrum Management Center (SMC) for Dynamic Spectrum Management (DSM), or for Dynamic Line Management (DLM). The management system can communicate over a network to the DSL equipment and be located in remote servers or in the cloud, and so it can support long-term data storage and high-power computing.

A management system can maintain a long-term traffic history of line usage, traffic patterns, etc., and use this historic information to create a policy for DSL line low-power state transitions. For example, in one embodiment, it may be determined that a DSL line is rarely active between certain hours of the day, or with days of the week, and then low power states are enabled only during these hours when traffic is quiescent. Or, it may be determined that if a DSL line is quiescent for some number hours, then it is likely to remain quiescent for some additional number of hours, then low power states are enabled only during those additional hours.

The combined use of different transmission power states can be intelligently managed by a local real-time controller, a remote management system, or a combination of both. The real-time controller may reside in or near the user CPE or DSLAM, or both. Sufficient data and management controls are defined so that the management system can determine which settings to apply to different DSL transceivers.

In one embodiment, the real-time controller determines when parameter levels or combinations of parameter levels have reached values such as crossing thresholds, for a sufficient of time, to initiate a transition between different power states. The parameter levels can be traffic levels, throughputs, queue lengths, bandwidth demand, number of sessions, traffic descriptors, traffic predictions, time of day or time of week, user data, or other external inputs. The real-time controller implements state transitions that are allowed, increases and decreases power and PSD levels according to allowed levels, and affects state transitions after certain lengths of waiting time or hysteresis. The thresholds, allowed state transitions, allowed transmit power or PSD changes, times, etc., can be maintained in a data store, such as a management information base (MIB) and are referred to herein as the "LPM MIB elements," where LPM refers to Low-Power Mode.

According to one embodiment, the LPM MIB elements can be statically set, or occasionally updated by an external management system. LPM MIB elements should be set to accomplish one or more of the following: eliminate or minimize instability caused to other DSL lines, minimize delay, maximize user-perceived QoE, and minimize power usage. The LPM MIB elements may be determined in an iterative "re-profiling" process, which sets MIB elements in the DSL transceivers, monitors performance of the DSL transceivers thusly configured, and then re-sets the MIB elements in an iterative loop until an acceptable level of performance is achieved. MIB elements may also be computed, or extrapolated from known data, in one embodiment.

The management system may set MIB elements separately and independently on each DSL line, or the MIB elements may be jointly set across multiple DSL lines. DSL lines in the same cable, binder, neighborhood, or geographic area may be grouped for jointly determining MIB elements. For example, in one embodiment, various LPM MIB elements may be changed on DSL line 1, then DSL line 2 monitored to see if it is stable in view of any crosstalk induced from DSL line 1 with these settings. This monitoring data is then used to determine jointly acceptable LPM MIB element settings.

In many cases, it may be that the time-varying crosstalk from a DSL line changing power states will have little or no impact on other, nearby, DSL lines. In these cases the management system can safely set LPM MIB elements more aggressively for high power savings and low delay, allowing for rapid wake up or the use of discontinuous operation at relatively high power levels.

In one embodiment of the invention, low-power state transitions are controlled so that they do not cause instability on nearby DSL lines receiving crosstalk. Control is primarily done by limiting each increase in transmit PSD and transmit power, how often these increases may occur, and the maximum transmit power and transmit PSD with discontinuous operation. These limits are generally controlled via LPM MIB elements, and they can vary line-by-line and can be determined in different ways, such as: overall via offline studies, dynamically via management re-profiling, dynamically via calculation, and estimated or extrapolated from known data, or from data from nearby DSL lines.

Channel Tracking

Current standards such as ADSL2/ADSL2plus [ITU-T G.992.3/G.992.5] do not allow bitswap (i.e., switching subcarriers) in low-power states. Also, when exiting to full-power state the bits (bi) table and gains (gi) table that were last used in full-power state are generally used regardless of any changes in the channel environment that occurred during low-power states, such as the DSL environment noise, crosstalk in nearby DSL lines, or channel response. Embodiments of this invention can enable bitswap, SRA, other online reconfiguration (OLR) functions, and channel tracking while in low-power states. The bit loading (bi) and gains (gi) tables may be set based on the DSL environment immediately before making a power state transition, as well as accounting for the previously known environment values.

Transition to higher speed transmit power states may be rapid or gradual. The bi values applied in the L0 state or another higher speed state can extrapolated from the bi values in the current VDSL2 LPM, and these bi can also be extrapolated from, or simply use, stored values that were used in previous occupancy of that LPM state. Note that this extrapolation should be conservative, with low bi values applied when first entering the L0 state to avoid a re-train of the DSL line. The bi values in the L0 state may be subsequently improved with SRA.

It may be difficult to maintain synchronization and accurate channel and noise estimation for a DSL line during discontinuous operation of the DSL line, particularly if the DSL line is quiescent for long time periods. Embodiments of the invention can control the minimum duration of "on" times and the maximum duration of "off" times in discontinuous operation to ensure continued synchronization and channel tracking. Embodiments can periodically transmit symbols to maintain synchronization, including synchronization symbols. These synchronization symbols can be dummy symbols if there is insufficient data traffic. With vectoring, channel tracking includes tracking the crosstalk channels. The rate of recurrence of transmitting channel estimation sequences for vectoring can be enabled and controlled to ensure accurate vectoring crosstalk channel estimation with discontinuous operation.

PSD Shaping

Figure 7:
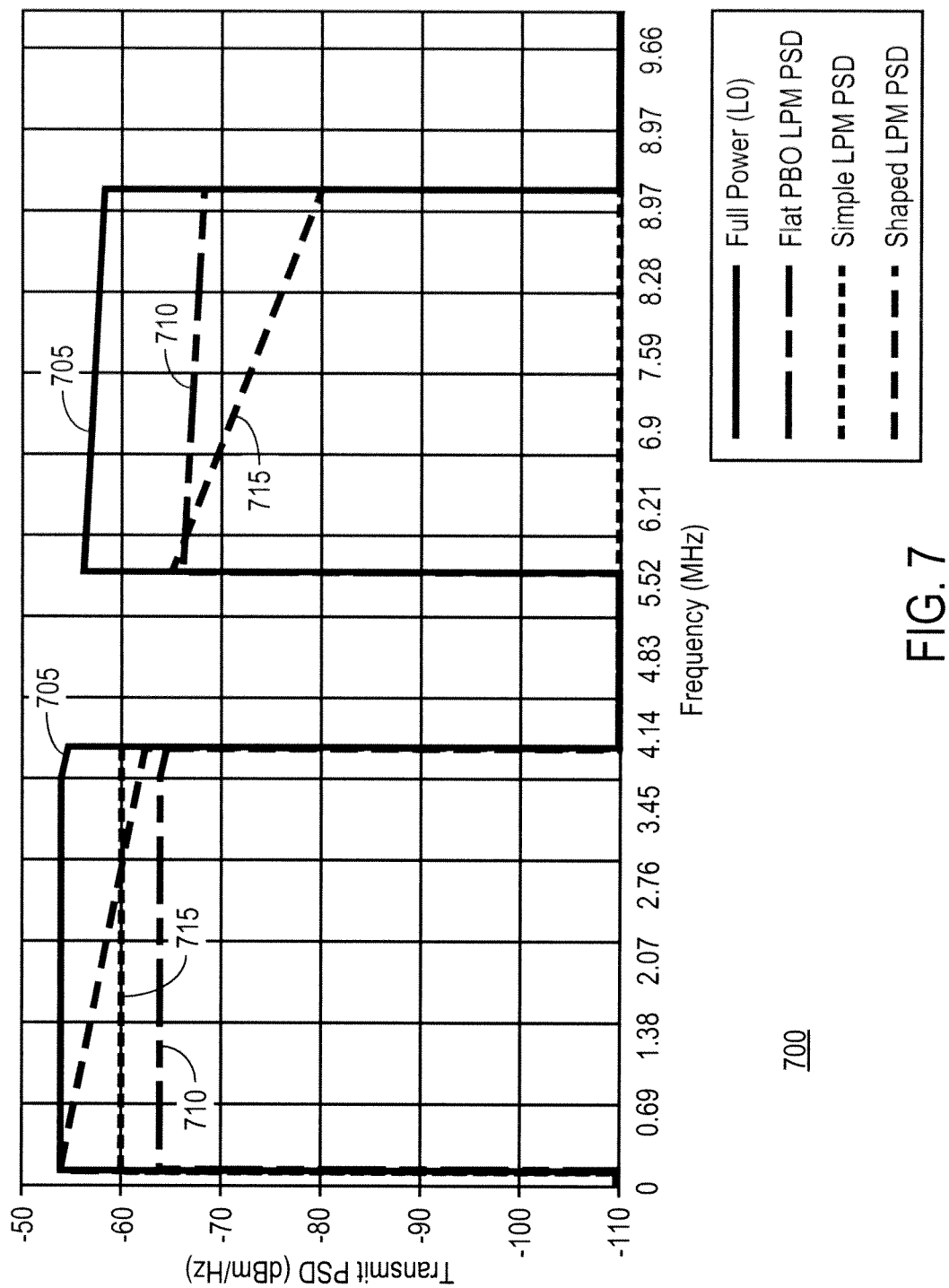
FIG. 7 illustrates examples of different transmitted low-power mode (LPM) power spectral densities (PSDs) according to embodiments of the invention.

FIG. 7 illustrates at 700 examples of different transmitted low-power mode (LPM) power spectral densities (PSDs) according to embodiments of the invention. These examples are downstream VDSL transmit PSDs, but the shaping could be performed upstream or with other systems such as G.fast. For comparison, a full power (L0) transmit PSD is shown at 705. A flat power back-off (PBO) LPM PSD is shown at 710, a simple LPM PSD that only transmits on low frequencies is shown at 715, and a shaped LPM PSD is shown at 720. Transitioning into a low power state often alters the transmit power spectral density (PSD), changing it to an "LPM PSD." This LPM PSD can have a simple flat power backoff (PBO) illustrated at 715, which lowers the transmit PSD by the same amount at every frequency, in one embodiment. Some sub-carriers may be turned off and not used. In another embodiment, frequency-shaped LPM PSDs 720 are used in low-power states. Low frequencies experience lower attenuation than high frequencies, and so low-power states may concentrate transmit power at low frequencies. The transmitted LPM PSD can be shaped and optimized by the management system for power savings. This shaping can simply reduce the number of active frequency tones such as using only low frequencies, or it can result from a more complex optimization with respect to a three-way tradeoff in power usage, line performance, and crosstalk impact.

LPM and Vectoring

The use of low power states described herein can be combined with vectoring. The vector pre-coder in the DSLAM or VTU-O is ideally configured with coefficients that result in cancellation of all the far end cross talk (FEXT) in the vectored group received at the CPE or VTU-R. However, as the transmit power is varied or when DSL lines are temporarily shut down due to going into low power states, then the vector precoder coefficients can differ from their ideal values, resulting in loss of SNR margin. There are two ways of mitigating this loss: update the vector precoder coefficients as lines in the vectored group change power state, or ensure there is sufficient SNR margin to continue operation of the line as the vector precoder coefficients differ from their ideal values. Vectoring precoder coefficients can be coordinated and updated as DSL lines with crosstalk canceled by vectoring go in and out of low-power states or vary transmit power. Discontinuous operation can be coordinated with vector precoding to control and handle the SNR degradation caused by DSL lines turning off and on. The rate of recurrence and size of power increase steps may be changed if all the time-varying crosstalk is within a single vectored group of DSL lines or otherwise mutually crosstalk cancelled, from the settings that would be used between DSL lines that are not mutually crosstalk cancelled.

G.fast

The emerging ITU G.fast specification uses time-division duplex (TDD), which alternately transmits downstream and upstream. TDD can be considered a type of discontinuous operation and it generates time-varying crosstalk that may harm other systems sharing the same cable. In particular, VDSL lines can share the same frequencies as G.fast, with the lower G.fast frequencies overlapping VDSL frequencies. VDSL refers to any VDSL variant including VDSL1, VDSL2, and vectored VDSL2. The transmit PSD of the G.fast system may be lowered within the VDSL bands, to levels such that the G.fast crosstalk does not destabilize VDSL lines. In one embodiment, this may be done asymmetrically, with different PSD levels upstream and downstream, and it can have different PSD levels in the upstream and downstream VDSL bands. The G.fast transmit PSD level within the VDSL bands can be set to enable compatibility with VDSL, to lower G.fast power usage, or both.

Example Definitions of LPM MIB Elements

These LPM MIB elements are used for configuration and control of VDSL2 LPM. They can also be used to query or monitor LPM status.

Power Management State Forced (PMSF). This configuration parameter defines the DSL line states to be forced by the near-end xTU on this DSL line. It is coded as an integer value.

Power Management State Enabling (PM Mode). This configuration parameter defines the DSL line states the xTU-C or xTU-R may autonomously transition to on this DSL line.

Minimum L0 time interval between L2 exit and next L2 entry (L0-TIME). This parameter represents the minimum time (in seconds) between an exit from the L2 state and the next entry into the L2 state.

Minimum L2 time interval between L2 entry and first L2 trim (L2-TIME). This parameter represents the minimum time (in seconds) between an entry into the L2 state and the first power trim in the L2 state and between two consecutive power trims in the L2 state.

Maximum aggregate transmit power reduction per L2 request or L2 power trim (L2-ATPR). This parameter represents the maximum aggregate transmit power reduction (in dB) that can be performed in the L2 request (i.e. at transition from L0 to L2 state) or through a single power trim in the L2 state.

Total maximum aggregate transmit power reduction in L2 (L2-ATPRT). This parameter represents the total maximum aggregate transmit power reduction (in dB) that can be performed in an L2 state.

Minimum L2 time interval between L2 power increases (L2-TIMEINC). This parameter represents the minimum time (in seconds) between entry into L2 low power state and the first L2 power increase request and between two consecutive L2 power increase requests.

Minimum L2 time interval in L2.2 (L2.2-TIMEINC). This parameter represents the minimum time (in seconds) between entry into L2.2 low power state and the first power increase request.

Maximum aggregate transmit power increase per L2 power increase (L2-ATPRINC). This parameter represents the maximum transmit power increase (in dBm) that is allowed in an L2 power increase request.

Minimum time interval between L2.1 and L2.2 (L2.1-TIME). This parameter limits the minimum time (in seconds) between entering L2.1 and then transitioning to discontinuous operation in L2.2.

Minimum stable discontinuous transmit power trim (L2.2-MIN). This parameter represents the minimum decrease in aggregate transmit power level which may be used in low-power state L2.2, This level is the dBm decrease below the maximum aggregate downstream transmit power [G.993.2 Table 6 1].

Allowed State Transitions (LPM STATE TRANS). For every pair of distinct power states (A, B), a transition from A to B is either enabled or disabled, where A, B are elements of {L0, L2.0, L2.1, L2.2}. Encoded as a 12-bit bitmap.

Minimum data rate in L2.2 (L2-2 MIN DATA): This parameter is the minimum data rate that is supported during operation in L2.2 low-power mode.

Minimum discontinuous on time (MIN-ON). This parameter is the minimum time (in seconds) of a distinct on time period or contiguous burst of transmission during discontinuous operation in L2.2 state.

Maximum discontinuous off time (MAX-OFF). This parameter is the maximum time (in seconds) of a distinct off time period or a contiguous quiescent transmitter time period during discontinuous operation in L2.2 state.

LPM state-transition increase traffic threshold (LPM-THRESHINC). This parameter is defined as the data rate threshold between each adjacent state and sub-state that traffic rates must be exceeded to start and run a time counter for a state transition to increase power. Defined as a 12-octet bit map, with each octet indicating the percentage of ATTNDR (0-100%) on this DSL line. Exceeding this traffic threshold starts a counter that runs as long as the threshold condition holds, and causes a power state transition if the counter exceeds the appropriate time interval; L2-TIMEINC or L2.2-TIMEINC.

LPM state-transition decrease traffic threshold (LPM-THRESHDEC). This parameter is defined as the data rate threshold between each adjacent state and sub-state that traffic rates must be below to start and run a time counter for a state transition to decrease power. Defined as a 12-octet bit map, with each octet indicating the percentage of ATTNDR (0-100%) on this line. Being below this threshold starts a counter that runs as long as the threshold condition holds, and causes a power state transition if the counter exceeds the appropriate time interval; L2-TIMEINC or L2.2-TIMEINC.

LPM data rate (LPM-DATARATE) (read only). This parameter is defined as the data rate during the most recent occupancy of each LPM state and sub-state. Defined as two octets representing data rate in units of 20 kbps from 0 to 1.31068 Gbps, with special value FFFF indicating more than 1.31068 Gbps.

Indication of support for traffic prioritization (HI-QUEUE). This parameter indicates that the transceiver supports prioritization of high-priority traffic such as VoIP within the transceiver queues. Boolean, read-only.

LPM queue depth (HIQUEUE DEPTH). Indicates the depth of the queue (kBytes) that supports high-priority traffic. Supported if HIQUEUE==true. Read-only.

Indication of support for notification of an impending session (SESSION). This parameter indicates that the transceiver supports that the notification of an impending high-traffic session initiates an exit from low-power states to full-power. Boolean, read-only.

Indication of impending session start (SESSION IMPENDING). This parameter notifies the transceiver that a new high-traffic session is impending. Upon reception, the transceiver begins exiting low-power states to full-power.

Additionally, performance can be monitored with existing parameters such as: actual data rate, actual noise margin, ACTATP; as well as with the error counters such as: CV-C, FECS-L, ES-L, SES-L, LOSS-L, and UAS-L. Thus, embodiments described herein provide for a method and apparatus for operating a transceiver coupled to a digital subscriber line (DSL) line, comprising reducing a transmit power level of the transceiver from a first transmit power level sufficient for the transceiver to continuously transmit data on the DSL line at a first bit rate to a second transmit power level below the first transmit power level sufficient for the transceiver to continuously transmit data on the DSL line at a second bit rate that is lower than the first bit rate and without generating time-varying crosstalk sufficient to destabilize a nearby DSL line, and repeatedly suspending the transceiver from transmitting data on the DSL line for a period of time without generating further time-varying crosstalk sufficient to destabilize the nearby DSL line and only while the transmit power level of the transceiver is reduced to the second transmit power level.

In one embodiment, the second bit rate that is lower than the first bit rate on the DSL line is sufficient for the transceiver to transmit Voice over Internet Protocol (VoIP) data, keep alive data, or both; on the DSL line.

Further, repeatedly suspending the transceiver from transmitting data on the DSL line for a period of time comprises one of: turning off transmitter functionality of the transceiver; turning off receiver functionality of the transceiver; turning off the transmitter functionality of the transceiver for a period of time no longer than required to maintain synchronization of, or to track channel variations in, the DSL line; turning off the transmitter functionality of the transceiver for a period of time at least equal to a duration of time needed to transmit a discrete multi-tone (DMT) symbol; transmitting pre-coding signals for use in vectoring; and turning off a plurality of transceiver functionalities to decrease transceiver power consumption.

In one embodiment, the second transmit power sufficient for the transceiver to continuously transmit data on the DSL line at a second bit rate is selected from one of a group of low-power mode (LPM) PSDs consisting of: a downstream transmit PSD, an upstream transmit PSD, a flat power back-off (PBO) PSD, a simple LPM PSD that only transmits on low frequencies, and a frequency-shaped LPM PSD.

In one embodiment, repeatedly suspending the transceiver from transmitting data on the DSL line for a period of time involves repeatedly suspending the transceiver from transmitting data on a subset of sub-carrier frequencies on the DSL line while at the same time the transceiver continues to transmit data on the other sub-carrier frequencies not in the subset on the DSL line.

In one embodiment, increasing the transmit power level of the transceiver from the second transmit power level sufficient for the transceiver to continuously transmit data on the DSL line at the second bit rate to the first transmit power level sufficient for the transceiver to continuously transmit data on the DSL line at the first bit rate is accomplished without generating crosstalk sufficient to destabilize the nearby DSL line. In one embodiment, this is accomplished by controlling the increase in the transmit power level according to a plurality of values of transceiver configuration and operation parameters maintained in a data store to limit time-varying crosstalk in the nearby DSL line. Further, increasing the transmit power level of the transceiver from the second transmit power level to the first transmit power level comprises, in one embodiment, increasing the transmit power level from the first transmit power level to the second transmit power level in a series of steps incurred over a duration of time, in which for each step a maximum increase in the transmit power level is allowed such that transmitting data on the DSL line does not generate crosstalk sufficient to destabilize the nearby DSL line. Each step is of a minimum duration of time sufficient to allow the nearby DSL line to adapt to any change in crosstalk, generated by data being transmitted on the DSL line, without incurring errors, a restart, or a resynchronization of the nearby DSL line. The nearby DSL line adapts to any change in crosstalk generated by data being transmitted on the DSL line using seamless rate adaptation (SRA).

In one embodiment, the transceiver configuration and operation parameters maintained in a data store comprise a number of management information base (MIB) elements relating to configuration and operation of the transceiver and maintained in a MIB database. The MIB elements may each be set to a value according to an iterative process comprising the steps of: setting the values of one or more of the plurality of MIB elements in the transceiver; monitoring performance of the transceiver with the values as set; and resetting the values of one or more of the plurality of MIB elements in the transceiver responsive to monitoring the performance.

In one embodiment, the iterative process further comprises: monitoring the nearby DSL line for stability while performing the iterative process; and setting the values of one or more of the MIB elements in the transceiver further responsive to the monitoring of the nearby DSL line.

In one embodiment, the MIB elements are associated with each of a plurality of transceivers each coupled to a corresponding plurality of DSL lines, wherein a DSL line is selected to be in the corresponding plurality of DSL lines based on one or more of: crosstalk levels between the DSL line and a nearby DSL line; the loop, cable, and/or binder in which the DSL line exists; neighborhood information; and geographic data.

Further embodiments contemplate storing prioritized traffic in a transmit data queue associated with the transceiver when the transceiver is suspended from transmitting data on the DSL line for a period of time, and from which to transmit the prioritized traffic when the transceiver is no longer suspended from transmitting data on the DSL line. Alternatively, embodiments contemplate storing prioritized traffic in a transmit data queue associated with the transceiver when the transceiver is operated at a second bit rate that is lower than the first bit rate for a period of time, while not transmitting traffic that is not stored in the prioritized traffic transmit data queue.

In embodiments of the invention, repeatedly suspending the transceiver from transmitting data on the DSL line for a period of time further involves controlling a minimum duration of time during with the transceiver is transmitting data, including a synchronization symbol, on the DSL line between the periods of time during which the transceiver is suspended from transmitting data on the DSL line to ensure synchronization and channel tracking of the DSL line. Repeatedly suspending the transceiver from transmitting data on the DSL line for a period of time may also involve controlling a maximum duration of time during which the transceiver is suspended from transmitting data on the DSL line to ensure synchronization and channel tracking of the DSL line.

In some embodiments, reducing a transmit power level of the transceiver from a first transmit power level sufficient for the transceiver to continuously transmit data on the DSL line at a first bit rate to a second transmit power level below the first transmit power level sufficient for the transceiver to continuously transmit data on the DSL line at a second bit rate that is lower than the first bit rate comprises shaping a transmit power spectral density (PSD) to vary the extent to which to reduce the transmit power level for different transmit frequency bands.

Other embodiments include updating a signal to noise ratio (SNR) margin to account for mis-matched vector precoder coefficient values associated with the DSL line, responsive to repeatedly suspending the transceiver from transmitting data on the DSL line for a period of time. Additional embodiments comprise updating vector precoder coefficient values associated with the DSL line, responsive to repeatedly suspending the transceiver from transmitting data on the DSL line for a period of time, to avoid signal to noise ratio (SNR) degradation of the nearby DSL line that may be caused by the repeated suspensions.

If the transceiver is a G.fast transceiver, reducing the transmit power level of the transceiver from the first transmit power level to the second transmit power level comprises reducing the transmit power level of the G.fast transceiver within low frequency bands to enable operation of the DSL line in a cable or loop or binder comprising other DSL lines operating according to a Very high speed/Very high bit rate DSL (VD SL) standard.

CONCLUSION

In this description, numerous details have been set forth to provide a more thorough explanation of embodiments of the present invention. It should be apparent, however, to one skilled in the art, that embodiments of the present invention may be practiced without these specific details. In other instances, well-known structures and devices have been shown in block diagram form, rather than in detail, in order to avoid obscuring embodiments of the present invention.

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems appears from the description herein. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

What is claimed is:

1. A method for operating a transceiver coupled to a digital subscriber line (DSL) line, comprising:
   reducing a transmit power level of the transceiver from a first transmit power level sufficient for the transceiver to continuously transmit data on the DSL line at a first bit rate to a second transmit power level below the first transmit power level sufficient for the transceiver to continuously transmit data on the DSL line at a second bit rate that is lower than the first bit rate and without generating time-varying crosstalk sufficient to destabilize a neighboring DSL line; and
   repeatedly suspending the transceiver from transmitting data on the DSL line for a period of time without generating further time-varying crosstalk sufficient to destabilize the neighboring DSL line and while the transmit power level of the transceiver is reduced to the second transmit power level.

2. The method of claim 1, wherein the second bit rate that is lower than the first bit rate on the DSL line is sufficient for the transceiver to transmit one or more of Voice over Internet Protocol (VoIP) data, or keep alive data; on the DSL line.

3. The method of claim 1, wherein repeatedly suspending the transceiver from transmitting data on the DSL line for a period of time comprises one of:
   turning off transmitter functionality of the transceiver;
   turning off receiver functionality of the transceiver;
   turning off the transmitter functionality of the transceiver for a period of time no longer than required to maintain synchronization of, or to track channel variations in, the DSL line;
   turning off the transmitter functionality of the transceiver for a period of time at least equal to a duration of time needed to transmit a discrete multi-tone (DMT) symbol;
   transmitting pre-coding signals for use in vectoring; or
   turning off a plurality of transceiver functionalities to decrease transceiver power consumption.

4. The method of claim 1, wherein the second transmit power sufficient for the transceiver to continuously transmit data on the DSL line at a second bit rate is selected from one of a group of low-power mode (LPM) PSDs which includes one of:
   a downstream transmit PSD,
   an upstream transmit PSD,
   a flat power back-off (PBO) PSD,
   a simple LPM PSD that only transmits on some frequencies, or
   a frequency-shaped LPM PSD.

5. The method of claim 1, wherein repeatedly suspending the transceiver from transmitting data on the DSL line for a period of time comprises repeatedly suspending the transceiver from transmitting data on a subset of a plurality of sub-carrier frequencies on the DSL line while the transceiver continues to transmit data on other of the plurality of sub-carrier frequencies not in the subset on the DSL line.

6. The method of claim 1, further comprising increasing the transmit power level of the transceiver from the second transmit power level sufficient for the transceiver to continuously transmit data on the DSL line at the second bit rate to the first transmit power level sufficient for the transceiver to continuously transmit data on the DSL line at the first bit rate and without generating crosstalk sufficient to destabilize the neighboring DSL line.

7. The method of claim 6, wherein increasing the transmit power level of the transceiver from the second transmit power level to the first transmit power level comprises controlling the increase in the transmit power level according to a plurality of values of transceiver configuration and operation parameters maintained in a data store to limit time-varying crosstalk in the neighboring DSL line.

8. The method of claim 6, wherein increasing the transmit power level of the transceiver from the second transmit power level to the first transmit power level comprises increasing the transmit power level from the first transmit power level to the second transmit power level in a series of operations incurred over a duration of time, in which for at least one operation a maximum increase in the transmit power level is allowed such that transmitting data on the DSL line does not generate crosstalk sufficient to destabilize the neighboring DSL line.

9. The method of claim 8, wherein the at least one operation is of a minimum duration of time sufficient to allow the neighboring DSL line to adapt to any change in crosstalk, generated by data being transmitted on the DSL line, without incurring errors, a restart, or a resynchronization of the neighboring DSL line.

10. The method of claim 9, wherein the neighboring DSL line is to adapt to any change in crosstalk generated by data being transmitted on the DSL line using seamless rate adaptation (SRA).

11. The method of claim 7, wherein the transceiver configuration and operation parameters maintained in a data store comprise a plurality of management information base (MIB) elements relating to configuration and operation of the transceiver and maintained in a MIB database.

12. The method of claim 11, wherein at least one of the plurality of MIB elements is set to a value according to an iterative process comprising the operations of:
   setting the values of one or more of the plurality of MIB elements in the transceiver;
   monitoring performance of the transceiver with the values as set; and
   resetting the values of the one or more of the plurality of MIB elements in the transceiver responsive to monitoring the performance.

13. The method of claim 12, further comprising:
   monitoring the neighboring DSL line for stability while performing the iterative process; and
   setting the values of the one or more of the MIB elements in the transceiver further responsive to the monitoring of the neighboring DSL line.

14. The method of claim 11, wherein the plurality of MIB elements are associated with at least one of a plurality of transceivers, at least one of which is coupled to a corresponding plurality of DSL lines, wherein a DSL line is selected to be in the corresponding plurality of DSL lines based on one or more of: crosstalk levels between the DSL line and a nearby DSL line; the loop, cable, and/or binder in which the DSL line exists; neighborhood information; or geographic data.

15. The method of claim 1, further comprising storing prioritized traffic in a transmit data queue associated with the transceiver when the transceiver is suspended from transmitting data on the DSL line for a period of time, and from which to transmit the prioritized traffic when the transceiver is no longer suspended from transmitting data on the DSL line.

16. The method of claim 1, further comprising storing prioritized traffic in a transmit data queue associated with the transceiver when the transceiver is operated at the second bit rate that is lower than the first bit rate for a period of time, while not transmitting traffic that is not stored in the prioritized traffic transmit data queue.

17. The method of claim 1, wherein repeatedly suspending the transceiver from transmitting data on the DSL line for a period of time further comprises controlling a minimum duration of time during with the transceiver is transmitting data, including a synchronization symbol, on the DSL line between the periods of time during which the transceiver is suspended from transmitting data on the DSL line to ensure synchronization and channel tracking of the DSL line.

18. The method of claim 17, wherein repeatedly suspending the transceiver from transmitting data on the DSL line for the period of time further comprises controlling a maximum duration of time during which the transceiver is suspended from transmitting data on the DSL line to ensure synchronization and channel tracking of the DSL line.

19. The method of claim 1, wherein reducing a transmit power level of the transceiver from the first transmit power level sufficient for the transceiver to continuously transmit data on the DSL line at a first bit rate to a second transmit power level below the first transmit power level sufficient for the transceiver to continuously transmit data on the DSL line at the second bit rate that is lower than the first bit rate comprises shaping a transmit power spectral density (PSD) to vary the extent to which to reduce the transmit power level for different transmit frequency bands.

20. The method of claim 6, further comprising updating a signal to noise ratio (SNR) margin to account for mismatched vector precoder coefficient values associated with the DSL line, responsive to repeatedly suspending the transceiver from transmitting data on the DSL line for a period of time.

21. The method of claim 1, further comprising updating vector precoder coefficient values associated with the DSL line, responsive to repeatedly suspending the transceiver from transmitting data on the DSL line for a period of time, to avoid signal to noise ratio (SNR) degradation of the neighboring DSL line that may be caused by the repeated suspensions.

22. The method of claim 1, wherein the transceiver is a G.fast transceiver and wherein reducing the transmit power level of the transceiver from the first transmit power level to the second transmit power level comprises reducing the transmit power level of the G.fast transceiver within low frequency bands to enable operation of the DSL line in a cable or loop or binder comprising other DSL lines operating according to a Very high speed or a Very high bit rate DSL (VDSL) standard.

23. An apparatus comprising:
a controller to operate a transceiver coupled to a digital subscriber line (DSL) to:
reduce a transmit power level of the transceiver from a first transmit power level sufficient for the transceiver to continuously transmit data on the DSL line at a first bit rate to a second transmit power level below the first transmit power level sufficient for the transceiver to continuously transmit data on the DSL line at a second bit rate that is lower than the first bit rate and without generating time-varying crosstalk sufficient to destabilize a neighboring DSL line; and
repeatedly suspend the transceiver from transmitting data on the DSL line for a period of time without generating further time-varying crosstalk sufficient to destabilize the neighboring DSL line and while the transmit power level of the transceiver is reduced to the second transmit power level.

24. The apparatus of claim 23, wherein the controller to repeatedly suspend the transceiver from transmitting data on the DSL line for a period of time comprises the controller to perform one or more of:
turn off transmitter functionality of the transceiver;
turn off receiver functionality of the transceiver;
turn off the transmitter functionality of the transceiver for a period of time no longer than required to maintain synchronization of, or to track channel variations in, the DSL line;
turn off the transmitter functionality of the transceiver for a period of time at least equal to a duration of time needed to transmit a discrete multi-tone (DMT) symbol;
transmit pre-coding signals for use in vectoring; or
turn off a plurality of transceiver functionalities to decrease transceiver power consumption.

25. A computer-readable non-transitory storage medium, comprising computer instructions, that when executed, cause a transceiver coupled to a digital subscriber line (DSL) line, to perform a method, comprising:
reducing a transmit power level of the transceiver from a first transmit power level sufficient for the transceiver to continuously transmit data on the DSL line at a first bit rate to a second transmit power level below the first transmit power level sufficient for the transceiver to continuously transmit data on the DSL line at a second bit rate that is lower than the first bit rate and without generating time-varying crosstalk sufficient to destabilize a neighboring DSL line; and
repeatedly suspending the transceiver from transmitting data on the DSL line for a period of time without generating further time-varying crosstalk sufficient to destabilize the neighboring DSL line and while the transmit power level of the transceiver is reduced to the second transmit power level.

* * * * *